Figure 1:
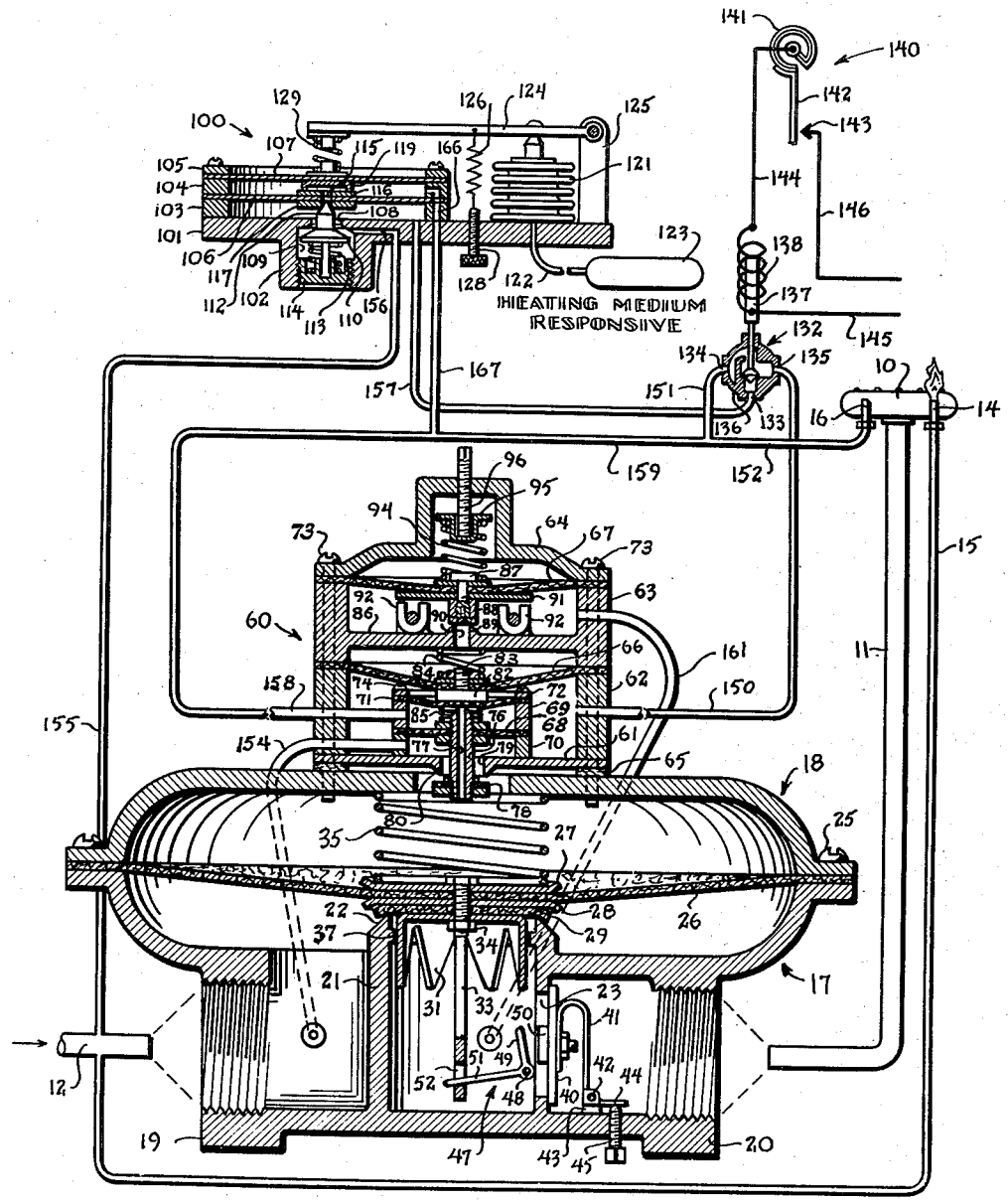

June 3, 1941.  J. L. HARRIS  2,244,555
MODULATING PRESSURE MOTOR OPERATED VALVE
Filed July 8, 1938  2 Sheets-Sheet 1

Inventor
John L. Harris
By George H Fisher
Attorney

June 3, 1941.                J. L. HARRIS                2,244,555
            MODULATING PRESSURE MOTOR OPERATED VALVE
                   Filed July 8, 1938        2 Sheets-Sheet 2

Inventor
John L. Harris
By George H Fisher
    Attorney

Patented June 3, 1941

2,244,555

UNITED STATES PATENT OFFICE 2,244,555

MODULATING PRESSURE MOTOR OPERATED VALVE

John L. Harris, Minneapolis, Minn., assignor to Minneapolis-Honeywell Regulator Company, Minneapolis, Minn., a corporation of Delaware Application July 8, 1938, Serial No. 218,245

18 Claims. (Cl. 236—80)

The present invention relates to a modulating pressure motor operated valve, and more particularly to one designed for the control of fluid fuel to burners.

In the application of Willis H. Gille, Serial No. 218,146, filed July 8, 1938, and directed to a control valve, there is disclosed a modulating pressure motor operated valve for controlling the flow of fuel to a burner in which the pressure motor consists of a movable wall, one side of which is exposed to the inlet pressure, throttled in accordance with a controlling condition, and the other side of which is subjected to the outlet pressure. This valve has the advantage of automatically compensating for the size or number of burners and is able to maintain the outlet pressure constant for any given value of the condition. While this valve has the above advantage, as well as numerous others, over valves of the prior art, it has several distinct disadvantages. In the first place, while it provides a snap opening in order to lessen the danger of "popback" in the mixer, the amount of snap opening is limited. In the second place, the maximum pressure available for operating the valve is that created by the pressure drop through the valve so that it is necessary to use a relatively large diaphragm in the pressure motor. In the third place, there is a constant bleeding of the fluid fuel while the valve is in operation; since this bleed fuel cannot be conveniently burned efficiently, the heating value of the same is largely lost.

An object of the present invention is to provide a modulating pressure motor actuated valve wherein a valve controlling the pressure in the motor is positioned in accordance with a variable control force and with the outlet pressure so that a constant relation is maintained between the outlet pressure and the control force.

A further object of the invention is to provide in a valve such as set forth in the preceding object, means whereby a substantially constant relation between outlet pressure and flow is maintained.

A further object of the invention is to provide a valve such as set forth in the previous objects in which the valve is not opened until the control force has attained a value sufficient to cause the valve to assume a minimum open position.

A still further object of the invention is to provide a valve such as set out above in which the outlet pressure is prevented from influencing the control valve until the valve reaches a relatively wide open position so that the valve initially moves to this position and then drops back to the correct position.

A further object is to provide such a valve in connection with a fluid fuel burner control system wherein the valve controls the fluid fuel and wherein the fluid fuel constitutes the pressure fluid for the motor.

A further object is to provide a valve particularly according to the preceding object in which full line pressure is available for operating the main pressure motor and in which the pressure differential between the throttled fuel line pressure and the outlet pressure is used to operate a pilot valve.

A further object is to provide a modulating pressure motor operated valve in which there is no continuous bleeding of pressure fluid.

Other objects of the invention will be apparent from a consideration of the accompanying specification, claims and drawings, in which—

Figure 2:
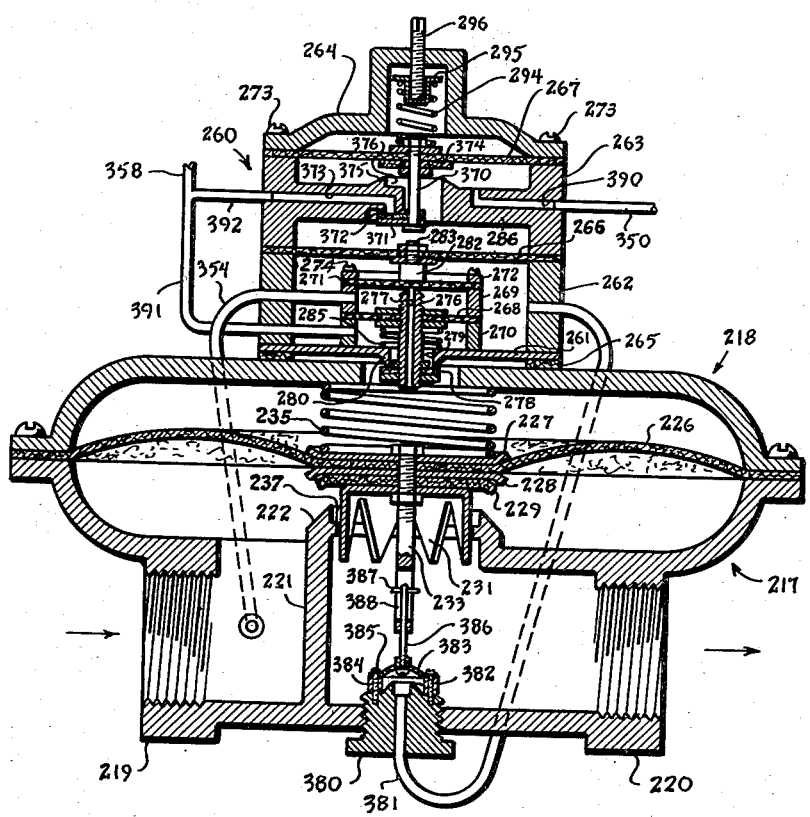

Figure 1 is a schematic view of a burner control system embodying the improved valve of the present invention, the valve being shown in section, and in which Figure 2 is a sectional view of a modified form of the pressure motor operated valve.

Referring to Figure 1 of the drawings, the improved valve of the present invention is shown embodied in a burner control system wherein the valve controls the flow of fuel to a fluid fuel burner. The valve is particularly adaptable to the control of gaseous fuel and it is accordingly shown in connection with a gas burning system. The gas burner is designated by the reference numeral 10, being supplied with gas through the pipe 11 which is connected to the outlet side of the improved valve. The inlet side of the valve is connected with a pipe 12 leading to any suitable source of gas (not shown). Located adjacent to the main burner 10 is a pilot burner 14 which is connected by a pipe 15 to the gas supply pipe 12. Also located adjacent the burner 10 is a bleed burner 16 which is provided for the purpose of burning gas which is allowed to escape from the pressure motor.

The pressure motor operated valve proper comprises a lower casing member 17 and an upper casing member 18. The lower casing member 17 is provided with a valve inlet portion 19 and an outlet 20. A cylindrical partition wall 21 is provided between the inlet 19 and the outlet 20, this partition wall being bevelled at 22 to provide a valve seat. A circular aperture 23 is located in the partition wall 21 adjacent the valve outlet 20 so that fluid entering the chamber formed by the cylindrical partition wall can pass through the outlet and the pipe 11 to the burner 10.

The two casing sections 17 and 18 are clamped together by screws 25, or other suitable fastening means. Clamped between the two casing sections is a diaphragm 26 which forms a movable wall of a pressure motor. Located on opposite sides of the central portion of the diaphragm 26 are backing plates 27 and 28. A valve seat disc 29 is disposed beneath the lower backing plate 28. A cup shaped throttling sleeve 31 is disposed beneath the seat disc 29 and the entire assemblage including the two backing discs 27 and 28, the seat disc 29, and the throttling sleeve 31 are clamped together and to the diaphragm by a bolt 33 and a nut 34. A spring 35 is interposed between the upper wall of the casing member 18 and the backing disc 27. The disc 29 thus constitutes a valve disc which cooperates with the seat 22, being biased into seating engagement therewith by the spring 35. The throttling sleeve 31 cooperates with an internal angular ridge 37 projecting inwardly from the interior of the partition wall 21 to throttle the fluid passing the valve disc 29.

Located in the outlet side of the lower casing member 19 is a disc 40 which is supported by a resilient member 41 pivotally mounted at 42 on a bracket 43. The resilient member 41 is provided with a portion 44 extended at right angles thereto, and cooperating with this portion 44 is an adjustment screw 45. Spring mounting member 41 is effective to bias the disc 40 into seating engagement with the partition wall 21 to close the aperture 23. The spring 41 is sufficiently light that very little force is required to move the disc 40 away from the aperture. Cooperating with the disc 40 is a bell-crank lever 47 pivotally mounted at 48. This bell-crank lever has a vertical leg 49 which is adapted to be moved against the head of a bolt 50 which serves to secure the disc 40 to the resilient supporting member 41. Bell-crank lever 47 has a horizontal arm 51 which extends through an opening 52 in the lower extended portion of the bolt 33. As the valve is moved towards open position, the bell-crank lever 47 is rocked in a clockwise direction and serves to move the disc 40 out of seating engagement with the cylindrical partition 21 to decrease the resistance to flow of gas therethrough. The purpose of this will be discussed in more detail later.

Secured on top of the casing member 18 is a multi-section control housing 60. This housing consists of a lower plate 61, a first cylindrical housing section 62, a second cylindrical housing section 63, and a cap member 64. Interposed between the plate 61 and the casing 18 is an annular sealing gasket 65 for the purpose of providing a pressure tight joint between the plate 61 and the casing 18. Interposed between the housing sections 62 and 63 is a diaphragm 66. Interposed between the housing section 63 and the cap 64 is a second diaphragm 67. The entire housing assemblage is clamped firmly together and to the casing 18 by screws 73 or other similar fastening means.

The diaphragm 66 constitutes the movable wall of a second pressure motor which is used to actuate a control valve controlling the pressure applied to the diaphragm 26. A diaphragm 68 is secured between two cylindrical members 69 and 70. A second diaphragm 71 is secured between member 69 and an annular ring 72. Screws 74 or other similar fastening means clamp the assembly consisting of ring 72, diaphragm 71, cylindrical members 69 and 70 and diaphragm 68 together and to the lower plate 61 of the housing assembly 60. Secured to the diaphragm 68 by any suitable fastening means is a cylindrical valve member 76 which has an axial passage 77 extending therethrough. Screw-threadedly fastened to the lower end of the valve member 76 is a valve seat assemblage 78. The center of the lower housing plate 61 is provided with an aperture 79 and adjacent this aperture, the disc is flared downwardly as at 80 to provide a valve seat to cooperate with the seat disc assembly 78. The upper end of the valve member 76 is adapted to seat on the under surface of the diaphragm 71. Secured to the diaphragm 66 is a bolt 83 having a relatively flat and large head 82. A spring 84 is interposed between a partition wall 86 of the housing section 63 and the diaphragm 66 serves to urge the head 82 into engagement with diaphragm 71 and in turn to force diaphragm 71 into seating engagement with the upper end of valve member 76.

A valve member 88 is secured through a bolt 87 to the diaphragm 67. The valve member 88 is adapted to seat on a valve seat 89 surrounding passage 90 extending through the partition wall 86. Clamped between the valve member 88 and the diaphragm 67 is an armature plate 91 which cooperates with a plurality of permanent magnets 92. The permanent magnets are suitably secured to the wall 86. While only two magnets have been shown, it is to be understood that as many may be employed as is necessary to impart a snap action to the diaphragm member 67 in a manner to be described later. A spring 94 bears at one end against the diaphragm 67 and at its other end against the spring retainer 95 which surrounds a set screw 96 extending through the upper portion of cap 64. By suitable adjustment of the set screw 96, the tension exerted by spring 94 can be varied.

A throttling valve assembly is generally designated by the reference numeral 100. This assembly comprises a base plate 101 which supports a plurality of annular rings 103, 104, and 105. Clamped between rings 103 and 104 is a diaphragm 106 and clamped between the rings 104 and 105 is a second diaphragm 107. The base plate 101 is provided with a downwardly extending hollow boss 102. The plate 101 is apertured at 108, which aperture communicates with the interior chamber 109 of the boss 102. Located within the interior of the boss and cooperating with the opening 108 is a valve member 110 which is urged by means of a spring 113 into seating engagement with the valve seat formed by opening 108. The spring 113 bears at its lower end against a closure plug 114 threaded into the lower end of the boss 102. The valve member 110 not only cooperates with a seat formed by aperture 108 but has an upper extension 112 which seats upon a seat formed by an aperture 115 extending through a pair of discs 116 and 117 secured to opposite sides of the diaphragm 106. Adapted to engage the disc 116 is an abutment member 119, which member is in the form of an inverted cup shaped disc secured to diaphragm 107. The side of the disc is partially cut away so that gas passing through aperture 115 is able at all times to pass freely into the space between diaphragms 106 and 107. The valve mechanism is actuated by a bellows element 121 which is connected through capillary tubing 122 to a bulb 123 filled with a volatile fluid. The bulb 123 is located so as to be responsive to the heating medium. For instance, the bulb may be located, in the case of a warm air furnace, in the bonnet of the furnace or in the return duct. In the case of a hot water furnace, the bulb 123 may extend into the water. In the case of a steam heating system, the bulb 123 may be replaced by a pressure responsive unit. Considering the case first mentioned wherein the bulb 123 is filled with a volatile fluid and is responsive to the temperature of the heated fluid, it will be obvious that upon an increase in temperature of this fluid, the fluid is vaporized and the increase in vapor pressure will cause bellows 121 to expand. The bellows 121 is adapted to cooperate with a lever 124 pivotally secured to a bracket 125 which is pivotally mounted on base plate 101. The lever 124 is urged downwardly by a spring 126 which has its upper end secured to the lever and its lower end to an adjusting screw 128. It may be noted that the spring 126 opposes the action of the bellows 121 and that accordingly the position assumed by lever 124 will be a resultant of the forces exerted by bellows 121 and spring 126. By adjusting the screw 128, the pressure setting of the device can be varied.

Extending between the lever 124 and the diaphragm 107 is a strain release spring 129.

A three-way solenoid valve 132 is also employed for controlling the flow of pressure fluid. This valve has three passages 133, 134, and 135. A valve member 136 is provided which in its lowermost position, as shown in the drawings, interrupts communication between passages 133 and 135. In its uppermost position, the valve interrupts communication between passages 134 and 135. Secured to the valve 136 is a solenoid core 137 which cooperates with a solenoid winding 138. Upon energization of this solenoid, the solenoid core 137 is drawn upwardly moving valve 136 to its uppermost position at which communication between passages 133 and 134 is interrupted and communication between passages 133 and 135 is established.

A thermostat 140 is employed for the purpose of controlling the energization of winding 138. This thermostat comprises bimetallic element 141 to which is secured a contact arm 142 cooperating with a fixed contact 143. One terminal of solenoid winding 138 is connected by a conductor 144 to the bimetallic element 141. The other terminal of the solenoid winding 138 is connected by conductor 145 to one terminal of any suitable source of power (not shown). The fixed contact 143 of thermostat 140 is similarly connected to the other terminal of the source of power by a conductor 146. Bimetallic element 141 is so disposed that upon a temperature fall, it is adapted to move contact blade 142 into engagement with contact 143. When this happens, the following circuit is established to the solenoid winding 138: from the source of power through conductor 146, contact 143, contact arm 142, bimetallic element 141, conductor 144, solenoid winding 138, and conductor 145 to the other terminal of the source of power. The energization of the solenoid core 138, as previously indicated, moves the valve to its uppermost position. Thus, whenever the thermostat 140 is "calling for heat," the valve 136 is in its uppermost position, and when the thermostat is "satisfied" the valve is in its lowermost position.

For purposes of clarity, the various pipe connections have not been described but will be mentioned in the following description of the operation as they play a part in the operation.

Operation

The various elements of the system are shown in the position assumed when the room temperature is satisfied. Under this condition, the valve 136 of the three-way valve 132 is in its lowermost position wherein communication between passages 133 and 135 is interrupted. In this position of the valve 136, communication is established between the under side of the diaphragm 66 and the bleed burner 16 through the following gas circuit: pipe 150, valve passage 135, passage 134, and pipes 151 and 152 to the bleed burner 16. The space underneath the diaphragm 66 is thus at substantially atmospheric pressure. The spring 84 is thus able to urge the head 82 of screw 83 downwardly forcing the valve member 76 downwardly to unseat the seating disc 78 from the valve seat 80. The result of this is that gas is able to pass from the inlet through pipe 154, through the space underneath diaphragm 68, and through aperture 79 to the interior of the upper casing 18 above the diaphragm 26. The result of this is that substantially full line pressure is applied on top of diaphragm 26 with the result that the pressures on opposite sides thereof are substantially equal and the valve disc 29 is maintained seated against valve seat 22 by means of spring 35.

Let it be assumed now that the thermostat 140 calls for heat. As previously indicated, this results in solenoid core 138 being energized to lift valve 136 to its uppermost position in which passages 133 and 135 are in communication. When this occurs, the following gas passage will be established between the inlet pipe 12 and the space beneath diaphragm 66: from supply pipe 12, through pipe 155, passage 156, opening 108, the space between diaphragm 106 and base plate 101, pipe 157, valve passage 133, passage 135, and through pipe 150 to the space underneath diaphragm 66. This will permit gas to flow rather freely from the supply pipe to the under side of the diaphragm 66. The pressure beneath diaphragm 66 will thus build up so as to move diaphragm 66 upwardly against the action of spring 84. This pressure will continue to build up both underneath the diaphragm 66 and beneath the diaphragm 106 until the pressure is such that diaphragms 106 and 107 are able to move up against the action of spring 129 sufficiently far that valve 110 is able to seat upon the valve seat formed by the passage 108. The pressure beneath diaphragms 106 and 66 will then correspond to the value of the condition to which bulb 123 is responsive.

As previously noted, the building up of pressure beneath diaphragm 66 causes the same to move upwardly, moving the valve member 76 upwardly with it. When the diaphragm moves up sufficiently far, the valve seat disc 78 seats against the valve seat 80 preventing further entrance of the supply pressure through pipe 154 to the upper side of the diaphragm. Upon further movement of the diaphragm 66 upwardly, the spring 85 is able to move diaphragm 71 away from the upper end of valve member 76. When this occurs, gas is able to escape from the upper side of diaphragm 26 through the following gas circuit: through passage 77, the space between diaphragms 68 and 71, and pipes 158, 159, and 152 to the bleed burner 16. As soon as the gas is allowed to escape, the pressure underneath diaphragm 26 is able to lift the diaphragm upwardly against the action of spring 35. This upward movement of the diaphragm 26 will move valve disc 29 off of its seat so as to cause an initial flow of gas through the throttling sleeve 31. The pressure of the gas causes the disc 40 to be moved slightly away from the cylindrical partition 21, permitting gas to pass through the aperture 23.

The gas passing through the throttling sleeve 31 gradually results in a back pressure being built up in the outlet side of the valve. This back pressure is transmitted by means of a pipe 161 to the space beneath diaphragm 67. The gas passing through pipe 161 is, however, unable to pass through opening 90 at this stage, in view of the fact that the valve member 88 is in engagement with valve seat 89. The result is that the gas pressure gradually builds up beneath diaphragm 67 and a point is eventually reached at which the accumulated pressure is sufficient to move diaphragm 67 upwardly against the attractive force exerted by magnet 92 on the armature 91. The apparatus is so designed that this does not occur until the valve has moved to a relatively wide open position wherein the flow of gas to the gas burner 10 is adequate to properly ignite the burner without any "pop back" in the mixer. As soon as diaphragm 67 has moved upwardly, the valve member 88 is moved off of valve seat 89 and gas is able to pass from the outlet side through the pipe 161, through the space underneath diaphragm 67, through the aperture 90 to the space above diaphragm 66. The application of this outlet pressure to the top side of the diaphragm 66 results in diaphragm 66 moving downwardly forcing the diaphragm 71 into seating engagement with the valve member 76 and then moving valve member 76 downwardly so as to again unseat the valve seat disc 78 from the valve seat 80. It is understood that the last action is on the assumption that the control pressure maintained by the valve mechanism 100 is not sufficiently high to maintain the valve in the position to which it has been moved before diaphragm 67 was forced upwardly to move valve member 88 off of its seat. The result of the opening of valve disc 78 is that gas is once more able to pass from the inlet side of the valve through pipe 154 and passage 79 to the space above the diaphragm so as to cause the diaphragm to move downwardly. This will in turn decrease the amount of gas flowing through valve disc 29 and throttling sleeve 31 to in turn decrease the outlet pressure. It will be readily apparent that a point of equilibrium will be reached at which the opposing effects of the outlet pressure and the control pressure will be such that diaphragm 66 is maintained in a position at which both valve 78 is seated upon its seat 80 and the diaphragm 71 is against the upper end of the valve 76. In this position, none of the gas being used for control purposes is escaping from the system.

The valve will continue to maintain this position so long as the thermostat 140 is calling for heat and so long as the temperature to which bulb 123 is responsive does not change. Let it be assumed, however, that the temperature to which bulb 123 is responsive begins to rise by reason of the operation of the burner. When this happens, lever 124 will travel upwardly so that the tension exerted by spring 129 decreases. The gas pressure beneath diaphragm 116 is now able to move the diaphragms 106 and 107 upwardly against the action of spring 129 and inasmuch as valve member 110 is already seated, this valve member cannot move upwardly and follow the diaphragm 106. Consequently, the upper extension 112 of valve member 110 is moved out of seating engagement with the valve seat adjacent aperture 115. The result is that gas is able to pass from the space beneath diaphragm 66 through pipe 150, valve passage 135, passage 133, pipe 157, the space beneath diaphragm 106, passage 115, through the space underneath the diaphragm 107, through passage 166, and pipes 167, 159, and 152 to the bleed burner 16. The escape of gas through this passage will continue until the pressure beneath diaphragm 106 corresponds to the force exerted by spring 129, at which time the diaphragm 106 will again assume a position wherein passage of gas through aperture 115 is interrupted by the extension 112 of valve 110.

The partial escape of the gas from the chamber underneath diaphragm 66 will result in the diaphragm 66 moving downwardly so as to unseat valve 78 from the valve seat 80. When this happens, gas is again admitted from the supply through the pipe 154 and aperture 79 to the space above diaphragms 26 to build up the pressure on top of the diaphragm and move the valve towards closed position. Again this results in a decrease in the outlet pressure which in turn is communicated to the top side of diaphragm 66 so that a balance is again established between the two sides of the diaphragm 66 to reclose the valve seat member 78 against valve seat 80.

It will thus be seen from the foregoing description, that the valve is caused to always assume a position wherein the outlet pressure corresponds to the value of the controlling condition at 123. While such operation is relatively satisfactory, it has one defect in that a straight line relationship is not maintained between the outlet pressure and the flow of gas. In other words, when the valve is nearly closed, a very small change in outlet pressure will make a relatively large change in gas flow to the burner 10. As the valve is opened more and more to increase the outlet pressure, the effect upon the gas flow materially decreases. This is due to the quadratic relation between the pressure drop and the flow of fluid through an orifice. The mechanism comprising the disc 40 is designed for the purpose of compensating for this. As the valve is moved towards open position, the disc 40 is moved further and further away from the partition 21 by the gas acting against it so that the effective opening through the aperture 23 is increased. Thus when the outlet pressure is very small, the disc 40 will offer a considerable restriction to the flow of gas. As the outlet pressure increases, this restriction will be diminished. By properly designing the various elements, a linear relation may be maintained between the outlet pressure and the flow of gas to the burner. By reason of this arrangement, a substantial linear relation is maintained between the flow of gas to the burner and the temperature to which bulb 123 is responsive. The valve reaches a substantially open position only when the supply pressure is very low so as to necessitate a large opening of the valve to obtain a desired outlet pressure or when the heat demand is very large. In either event, it is urgent that the burner get as much gas as possible. The arrangement including the bell-crank lever 47 is for the purpose of mechanically moving the disc 40 a substantial distance away from aperture 23 when the valve disc 29 reaches a position wherein it is nearly wide open. It will be readily apparent that upward movement of bolt 33 secured to valve disc 29 will cause the bell-crank lever to rock in a clockwise direction and cause leg 49 thereof to bear against bolt 50 and push disc 40 away from aperture 23. By reason of the lost motion between leg 49 and disc 40, this will not happen until the valve disc 29 has moved nearly to open position.

If the temperature to which bulb 123 is subjected continues to rise sufficiently far so as to constantly decrease the pressure beneath diaphragm 66, which in turn moves the valve disc 29 towards closed position and consequently reduces the outlet pressure, a point is eventually reached at which any further decrease in outlet pressure causes the magnets 92 to attract the armature 91 moving the diaphragm 67 downwardly with a snap action and moving valve member 88 into engagement with valve seat 89. When this happens, the outlet pressure existing at that time is maintained above the space 66, inasmuch as the gas therein is unable to escape. The result is that the valve disc 78 continues to be held away from the valve seat 80 allowing the gas from the valve inlet to continuously enter through pipe 154 and passage 79 to the space above diaphragm 26. The result is that when the valve reaches this minimum closed position at which the back pressure is inadequte to resist the attractive force of magnets 92, the main valve continues to move to its closed position. The main valve position at which this occurs is closer to closed position than that at which the armature 91 is moved away from magnets 92 during the opening cycle to terminate opening movement of the valve. This is true by reason of the inherent differential in a magnetic snap action arrangement. Since it is possible to reduce gas flow to a much lower value without danger of "pop back" than it is possible to start burner operation with, this feature is highly desirable.

It is to be understood that regardless of the temperature of the bulb 123, upon thermostat 140 becoming satisfied, the main valve is moved towards closed position. This arises by reason of the fact that upon thermostat 140 being satisfied, the solenoid is deenergized and valve 136 is moved to its lowermost position. In this position of the valve, the gas flow from the control valve 100 through pipe 167 to the pipe 150 communicating with the under side of the diaphragm 66 is interrupted and pipe 150 is placed in communication with the bleed burner 16 in the manner described during the first portion of the description of the operation of the system. The result is that the pressure beneath diaphragm 66 is decreased to substantially atmospheric pressure so that the parts assume the position shown in the drawings. Upon thermostat 140 again calling for heat, the operation previously described will be repeated.

It is to be understood that the thermostat 140 functions as a limiting thermostat. In the usual heating installation, this thermostat will be placed in one of the rooms or at some other desired control point. So long as the valve is modulated in accordance with the heat load, this thermostat will continue to call for heat. As soon, however, as the heat supply becomes excessive so that the temperature begins to rise unduly in the locality at which thermostat 140 is located, this thermostat will operate to cause closure of the main valve and terminate burner operation.

It is to be noted from the foregoing operation that the full line pressure is available for operating the main diaphragm 26. Thus it is possible for full line pressure to be beneath the diaphragm while the upper side of the diaphragm is exposed to atmospheric pressure. This condition, of course, would only exist during a condition of excessive heat demand. It is further to be noted that a valve like the present invention entirely eliminates the need for any pressure regulator inasmuch as the valve automatically assumes a position at which the outlet pressure corresponds to the control pressure and that this control pressure is determined entirely by the temperature to which bulb 123 is subjected, being independent of the supply pressure. It will further be noted that with the present valve, a very large initial opening is obtained, this opening being followed by the valve moving back to the position called for by the temperature to which bulb 123 is subjected. It is further to be noted that with a valve of the present species, not only is a straight line relationship maintained between the outlet pressure and the controlling temperature but a straight line relationship is also maintained between the flow of gas and the controlling temperature.

*Species of Figure 2*

In Figure 2, there is shown a modification of the pressure motor operated valve of Figure 1. In view of the fact that the valve is connected in the same manner to the burner and since the controllers are identical, these controllers have not been shown. In order to facilitate a comparison of the figures, those elements of the present species which correspond to elements of the Figure 1 species have been indicated by reference numerals 200 higher than the reference numerals applied to the similar elements of Figure 1. Inasmuch as the structure of these elements will be obvious in view of the previous description of corresponding elements in Figure 1, these elements which correspond to those of Figure 1 will not be described in as much detail in connection with this species.

Referring to the drawings, the pressure motor operated valve proper comprises lower and upper valve casings 217 and 218, the lower valve casing having a valve inlet 219 and a valve outlet 220. A partition wall 221 is bevelled at 222 to provide a valve seat surrounding an opening through the wall 221. Clamped between the two sections of the valve housings 217 and 218 is a diaphragm 226. Secured to the diaphragm 226 are backing plates 227 and 228 and a valve seat 229. Also secured to the diaphragm 226 is a cup shaped throttling sleeve 231. The entire assemblage consisting of backing plates 227 and 228, seating disc 229, and throttling sleeve 231 are held together and to the diaphragm by means of a bolt 233. A spring 235 is located within the upper casing section 218 and serves to bias the valve disc 229 into seating engagement with the valve seat 222.

A control housing is generally designated by the reference numeral 260. This housing comprises a bottom plate 261, housing sections 262 and 263, a cap member 264, and diaphragm 266 and 267. The entire assemblage is held together and to the upper valve casing 218 by screws 273. A gasket 265 is interposed between the lower plate 261 and the valve casing 218 to prevent the escape of fluid. Located within the housing 260 is a valve assembly comprising cylindrical members 269 and 270, a ring 272, and diaphragms 268 and 271. This assemblage is held together and to the lower plate 261 by screws 274. A cylindrical valve member 276 is secured to the diaphragm 268 and carried thereby. The valve member 276 is provided with an axial passage 277 throughout the length thereof. The valve member 276 has secured to the lower end thereof a valve seat assembly 278 which seats on a downwardly extending annular portion 280 of plate 261, which portion 280 surrounds an opening 279 through the plate 261. Bearing against the upper surface of diaphragm 271 is a head 282 of a bolt 283 secured to diaphragm 266. Bearing against the diaphragm 267 is a spring 294 which bears at its upper end against a cup shaped spring retainer 295 which in turn bears against a set screw 296 extending through the upper wall of cap member 264.

The structure which has been described so far consists entirely of elements which correspond structurally to similar elements of the species of Figure 1. As will be indicated in the subsequent description of the operation, some of these elements play a slightly different function in the operation of the valve than they do in the preferred species. The elements which will be described hereinafter are for the most part novel to this species as far as both structure and function are concerned.

Secured to the diaphragm 267 is a valve stem 370 to which is secured a valve seating disc 371. This valve disc is designed to seat on a valve seat 372 which surrounds the outlet of a passage 373 through the center web 286 of the housing section 263. Also located on stem 370 in abutting engagement with the diaphragm 267 is a seating disc 374 which is secured to the diaphragm by any suitable fastening means. The seating disc 374 is adapted to cooperate with a valve seat 375 surrounding a passage 376 extending through the web 286.

A plug 380 is threadedly mounted in the lower wall of valve casing section 217. This plug has an aperture extending therethrough into which a pipe 381 extends. The upper extremity of this aperture is surrounded by a bevelled angular ridge 382 which forms a valve seat for a snap disc 383. The snap disc 383 is supported upon an annular spacer 384 and screws 385 are employed for holding the snap disc 383 and the spacer 384 to the plug 380. Secured to the snap disc 383 is a stem 386 which has a cross pin 387 secured in the upper end thereof. The cross pin 387 is slidable in a slot 388 in the bolt 233. The snap disc 383 is thus connected with the bolt 233 through a lost motion connection constituted by the stem 386 and cross pin 382 cooperating with the slotted portion of bolt 233.

The pipe 350 which corresponds with pipe 150 of the Figure 1 species leads from a control valve similar to the control valve assembly 100 of Figure 1. This pipe communicates with a passage 390 in the web 286 of housing section 263. It is to be understood that the pipe 350, corresponding to pipe 150 of the Figure 1 species, delivers the controlling pressure. The pressure of the fluid in this pipe is always equivalent to the pressure of the controlling condition according to which it is desired to modulate the valve. The pipe 358, like pipe 158 of the Figure 1 species, leads through suitable connections to a bleed burner. In this species, this pipe instead of being connected merely to one of the control chambers is connected through pipe 391 to the space between diaphragm 268 and plate 261 and is also connected by a pipe 392 and a passage 373 to the space above the diaphragm 266. The last connection is controlled by a valve disc 271.

*Operation of Figure 2 species*

The valve, as shown in the drawings, is in an intermediate position corresponding to an average value of the condition according to which the valve is throttled. Let it be assumed for the purpose of the following discussion that this condition is a furnace condition, such as bonnet temperature. If this temperature falls, the controlling pressure supplied by pipe 350 will rise. Since the pipe 350 is connected with the space above diaphragm 266 by passage 390, the space below diaphragm 267, and passage 376, the increase in pressure in pipe 350 will cause the pressure above diaphragm 266 to also increase. This will force diaphragm 266 downwardly which through the bolt head 282 and the diaphragm 271 forces the valve 276 downwardly to move the valve disc 278 away from the valve seat 280. The effect of this is to permit some of the gas above diaphragm 226 to escape through the following passage: through passage 279, the space between plate 261 and diaphragm 268, and through pipe 391 to pipe 358 which leads to the bleed burner. This escape of gas from above diaphragm 226 will reduce the pressure above the diaphragm permitting the same to move upwardly, moving the valve towards a wider open position so that the gas flow to the burner is increased. The moving of the gas valve to a wider open position increases the outlet pressure, and this increase in outlet pressure is transmitted beneath the valve disc 383 and through pipe 381 to the under side of diaphragm 266. The opening of the valve will continue until the increase in the outlet pressure applied beneath the diaphragm 266 counteracts the increase in control pressure. When this happens, valve disc 278 will again be seated and the diaphragm will remain in its new position.

Let it be assumed now that the heat demand decreases so that the heater temperature rises. This rise in heater temperature will result in a decrease in the control pressure which in turn results in the decrease in the pressure above diaphragm 266. This decrease in the pressure above diaphragm 266 causes this diaphragm to move upwardly which moves the bolt head 282 away from diaphragm 271. The valve member 276 by reason of the engagement of the valve disc 278 with the valve seat 280 cannot move upwardly so that the diaphragm 271 is readily displaced from the valve member 276. Gas passes from the inlet side of the valve through pipe 354 and entering the chamber beneath diaphragm 271 lifts the same away from valve member 276 and passes through passage 277 to the space above diaphragm 226. This results in an increase in the pressure above the diaphragm causing the diaphragm and valve 229 to move downwardly. This, in turn, results in a decrease in the gas supply to the burner in accordance with the increase in the furnace temperature which produced the change. This also results in a decrease in the outlet pressure which is transmitted through pipe 381 to the under side of the diaphragm 266. This closing of the valve continues until the decrease in outlet pressure results in the pressures on opposite sides of the diaphragm 266 again being balanced until the pressure differential on the diaphragm 266 is again such as to cause bolt head 282 to move diaphragm 271 into seating engagement with valve 276.

It will be noted that a spring 294 is urging diaphragm 267 downwardly and that the only force resisting downward movement of the diaphragm 267 is a force exerted by the controlling pressure on the under side thereof. If the temperature rises sufficiently far that this controlling pressure falls below a predetermined value, the spring 294 will overcome the effect of the controlling pressure on the under side of the diaphragm and will move the diaphragm 267 downwardly. The downward movement of the diaphragm 267 results in valve disc 371 being forced away from the valve seat 372 connecting the space above diaphragm 266 to the bleed line 358, the connection being effected by the passage 373 and pipe 392. The result is that the pressure above diaphragm 266 drops very rapidly causing the movement of the diaphragm 267 downwardly to be accelerated. This acceleration in the downward movement of diaphragm 267 is intensified by the fact that as the disc 374 approaches the seat 375, the effective area on the under side of the diaphragm 267 is decreased so that the total pressure on the under side of the diaphragm 267 is still further decreased. The result is that the diaphragm 267 will move downwardly with a very abrupt action and the pressure above diaphragm 266 will become equal to atmospheric pressure.

The sudden reduction of the pressure above diaphragm 266 causes this diaphragm to move upwardly permitting the diaphragm 271 to move upwardly so that gas may flow from the inlet through pipe 354, the space underneath diaphragm 271, and passage 277 to the space above diaphragm 226. Since the control pressure is no longer being applied to the top side of diaphragm 266, this increase in pressure will continue until the valve disc 229 seats on the valve seat 222 completely closing the valve. Just before the main valve closes, the cross pin 387 attached to stem 386 is engaged by the upper end of the slot 388 of the bolt 233. Further downward movement of the valve and consequently of the bolt 233 pushes valve stem 386 downwardly to cause valve disc 383 to snap over center. The purpose of this will be apparent from the following description of the operation.

Let it be assumed now that the temperature of the heater begins to fall, by reason of the valve being completely closed. This will result in the control pressure gradually increasing. Nothing will happen until the control pressure has increased sufficiently so that even when acting only on the portion of diaphragm 267 exclusive of disc 374, the pressure underneath the diaphragm 267 is sufficient to move the same upwardly against the action of the spring 294. As soon as the disc 374 starts to leave its seat, the effective area underneath the diaphragm 267 will be increased so that the diaphragm will continue to move upwardly with a snap action. This upward movement of the diaphragm 267 will cause disc 371 to move into seating engagement with valve seat 372 cutting off the escape of gas from above the diaphragm 266 out through the passage 373.

As soon as the escape of gas above passage 373 is cut off, the pressure above diaphragm 266 will build up very quickly to assume the control pressure which, since it is sufficient to raise diaphragm 267 upwardly when acting only on a part of the area thereof, is at a value corresponding to a valve opening of appreciable magnitude. The increase in pressure above diaphragm 266 results in valve member 276 being moved downwardly, so that the valve disc 278 is moved away from valve seat 280 permitting escape of pressure from above diaphragm 226 in the manner previously described when diaphragm 266 was moved downwardly. Ordinarily, the upward movement of the valve 229 caused by the escape of gas above diaphragm 226 would be terminated when the back pressure applied to the under side of diaphragm 266 reaches a value corresponding to the control pressure applied on top of the diaphragm 266. By reason of the previously described closure of snap disc valve 383, however, the gas from the outlet side is not permitted to flow through pipe 381 to the under side of the diaphragm 266. Consequently, the valve continues to move to open position until such time as the lower wall of the slot 388 engages the cross pin 387 and snaps the valve 383 to open position. Gas may now flow from the outlet side through pipe 381 to the under side of diaphragm 266 to increase the pressure below the diaphragm 266. Since the rebalancing has been temporarily interrupted, the back pressure will be much higher than that called for by the control pressure in pipe 350. Consequently, diaphragm 266 will now be moved upwardly to permit the pressure above diaphragm 226 to be increased and cause the valve disc 229 to move towards closed position. This return movement of the valve towards closed position will continue until the outlet pressure bears the desired relation to the control pressure 350. Inasmuch as the control pressure, as previously indicated, has a value corresponding to the partially open position of the valve, the valve will not move completely back to closed position.

It is, of course, understood that if the pressure through pipe 350 is abruptly decreased by the operation of a device such as the three way valve 132 of the species of Figure 1, the valve 229 will be moved to closed position in the same manner as when the pressure in pipe 350 is decreased in any other manner. In other words, it is contemplated that the pressure in pipe 350 may be controlled by both a throttling valve and an on and off valve as in Figure 1.

While no means has been shown in the species of Figure 2 for maintaining a constant relation between the outlet pressure and the flow through the valve, it is understood that such means can be provided in the Figure 2 species as well as the Figure 1 species and has been omitted merely for the purpose of simplifying the disclosure.

It will be noted that with the species of Figure 2, it is possible to have the valve upon opening to move to a desired position and then drop back to a second predetermined position, which position it is assured is sufficient to maintain combustion after the burner has once been ignited. It will further be seen that the device does not depend upon the storage of the outlet pressure on one side of the controlling diaphragm 256 as is necessary in the species of Figure 1.

While certain specific embodiments of the invention have been shown, it is to be understood that this is for purposes of illustration only and that the invention is to be limited only by the scope of the appended claims.

I claim as my invention:

1. In a fluid fuel burner control system, a main valve controlling the flow of fuel to the burner, a pressure motor for actuating said valve, means for applying fuel line pressure to said pressure motor, control valve means for controlling said last named means, a second pressure motor comprising a movable wall operatively connected to said control valve means, means operative to subject one side of said wall to a force continuously variable with a controlling condition, means operative to subject the other side of said wall to a pressure the value of which is determined by the fuel pressure on the outlet side of said valve, and means for rendering said last named means inoperative during movement of the valve in opening direction until the valve has reached a predetermined position at which the flow of fuel is sufficient to properly support combustion.

2. In combination, a main valve, fluid motor means for operating the same, means including a main controller for continuously subjecting said pressure motor to a pressure tending to move said valve in one direction, means responsive to the pressure on the outlet side of the valve opposing said last named means to thereby terminate valve movement when the outlet pressure corresponds to the position of the main controller, and means for rendering said last named means inoperative during movement of the valve in one direction until the valve has reached a predetermined position, whereby said valve moves continuously to said predetermined position and then moves back to a position at which the outlet pressure corresponds to the position of the controller.

3. In a heating system, in combination, a burner, a single valve in control of the supply of fuel to said burner, a pressure motor connected to said valve, a movable member responsive to a condition affected by burner operation, and control means associated with said pressure motor and movable member for causing said motor initially to open said valve relatively widely to insure proper ignition at the burner upon said movable member first assuming a position calling for burner operation, automatically to return the valve to a position corresponding to the value of the condition, and thereafter to move the valve toward wide open position in a plurality of steps as the condition changes.

4. In combination, a main valve, a pressure motor for actuating said valve, a source of pressure fluid, means including an inlet valve for admitting pressure fluid from said source to said pressure motor, means including an outet valve for permitting escape of pressure therefrom, a second pressure motor including a movable wall operatively connected to said inlet and outlet valves, means connecting one side of said wall to a source of control pressure, and means connecting the other side of said wall to the outlet side of said main valve.

5. In combination, a main valve, a pressure motor for actuating said valve, a source of pressure fluid, means including an inlet valve for admitting pressure fluid from said source to said pressure motor, means including an outlet valve for permitting escape of pressure therefrom, a second pressure motor including a movable wall operatively connected to said inlet and outlet valves, means connecting one side of said wall to a source of control pressure, means connecting the other side of said wall to the outlet side of said main valve, and means for interrupting said last named connecting means while said valve is opening until said valve reaches a predetermined position whereby said valve upon opening moves directly to said predetermined position and thereafter moves back to a position corresponding to the outlet pressure.

6. In combination, a main valve, a pressure motor for actuating said valve, a source of pressure fluid, means including an inlet valve for admitting pressure fluid from said source to said pressure motor, means including an outlet valve for permitting escape of pressure therefrom, a second pressure motor including a movable wall operatively connected to said inlet and outlet valves, means connecting one side of said wall to a source of control pressure, means connecting the other side of said wall to the outlet side of said main valve, and means for interrupting said connection to said source of control pressure whenever said control pressure assumes a value so low that the main valve will assume a position within a predetermined range adjacent closed position.

7. In combination, a valve, a pressure motor for operating the same, a variable source of control pressure, means for subjecting said pressure motor to a pressure differential so related to the control pressure and to the pressure on the outlet side of said valve that a definite relation is maintained between the control pressure and the outlet pressure, and means on the outlet side of said valve for offering a decreasing resistance to the flow of fuel as the outlet pressure increases in such a manner as to tend to maintain a straight line relation between the outlet pressure and the flow of fluid through said valve.

8. In combination, a valve, a pressure motor for operating the same, a variable source of control pressure, means for subjecting said pressure motor to a pressure differential so related to the control pressure and to the pressure on the outlet side of said valve that a definite relation is maintained between the control pressure and the outlet pressure, means on the outlet side of said valve for offering a decreasing resistance to the flow of fluid as the outlet pressure increases in such a manner as to tend to maintain a straight line relation between the outlet pressure and the flow of fluid through said valve, and means responsive to valve movement for rapidly decreasing the resistance offered by said means as said valve moves open beyond a predetermined position.

9. In a fluid fuel burner control system, a main valve controlling the flow of fuel to the burner, a pressure motor for modulatingly positioning said valve, means for conducting fuel to and from said pressure motor to act as the pressure fluid for said motor, and means controlled by a device responsive to a condition indicative of the need for burner operation for regulating the flow of fuel to and from said pressure motor, said last named means being operative to maintain at all times a pressure differential such as to maintain the valve in any one of a plurality of positions dependent upon the value of the condition and to permit escape of fuel from the pressure motor only when the valve position does not correspond to the value of the condition.

10. In a gas burner control system, a valve controlling the flow of gas to the burner, means including a pressure chamber for positioning said valve in any one of a plurality of positions depending upon the value of a control pressure in the pressure chamber, means for conveying gas from the inlet side of said valve to said pressure chamber, a three way valve mechanism operable in a first position to admit said gas to said pressure chamber, in a second position to conduct said gas from said chamber, and in a third position to retain the gas in the chamber, and means responsive to both the pressure of said gas in said pressure chamber and to the value of a controlling condition to maintain said valve mechanism in said third position as long as the gas pressure in the chamber corresponds to the value of the condition.

11. In a gas burner control system, a main valve controlling the flow of gas to the burner, a pressure motor for actuating the valve, means for conveying gas from the gas supply line into and out of said pressure motor, pilot valve means for controlling the pressure of the gas in said pressure motor, actuating means for said pilot valve means including a diaphragm, means for subjecting one side of said diaphragm to a pressure the value of which is determined by the gas pressure on the outlet side of said main valve, means for subjecting the other side of said diaphragm to a variable control force dependent in value on that of a controlling condition, and snap action means associated with the control means for the pilot valve means for causing continuous movement of said main valve during opening movement thereof until said valve has assumed a predetermined minimum open position.

12. In a gas burner control system, a main valve controlling the flow of gas to the burner, a pressure motor for actuating the valve, means for conveying gas from the gas supply line into and out of said pressure motor, pilot valve means for controlling the pressure of the gas in said pressure motor, actuating means for said pilot valve means including a diaphragm, means for subjecting one side of said diaphragm to a pressure the value of which is determined by the gas pressure on the outlet side of said main valve, means for subjecting the other side of said diaphragm to a variable control force dependent in value on that of a controlling condition, and snap action means associated with the control means for the pilot valve means for causing continuous movement of said main valve during opening movement thereof until said valve has assumed a predetermined minimum open position, said snap action means being further operative upon closing movement to cause continuous movement of said main valve from a predetermined minimum closed position to full closed position.

13. In a fluid fuel burner control system, a main valve controlling the flow of fuel to the burner, a pressure motor for actuating said valve, means including an inlet valve for admitting fuel under pressure from the inlet side of the main valve to said pressure motor, means including an outlet valve for permitting escape of fuel therefrom, actuating means for said inlet and outlet valves, means including a control device responsive to a condition indicative of the need for burner operation for creating a control force having a magnitude bearing a predetermined relation to the value of said condition, means for subjecting said actuating means simultaneously to said control force and to a force dependent upon the pressure of the fluid fuel on the outlet side of said main valve so that said actuating means is operative to position said inlet and outlet valves in accordance with the resultant of said control force and the outlet pressure.

14. In a fluid fuel burner control system, a main valve controlling the flow of fuel to the burner, a pressure motor for actuating said valve, means including an inlet valve for admitting fuel under pressure from the inlet side of the main valve to said pressure motor, means including an outlet valve for permitting escape of fuel therefrom, actuating means for said inlet and outlet valves, means including a control device responsive to a condition indicative of the need for burner operation for creating a control force having a magnitude bearing a predetermined relation to the value of said condition, means for subjecting said actuating means simultaneously to said control force and to a force indicative of the position of said main valve so that said actuating means is operative to position said inlet and outlet valves in accordance with the resultant of said control force and the outlet pressure.

15. In a gas burner control system, a main valve controlling the flow of gas to the burner, a pressure motor for actuating the valve, means for conveying gas from the gas supply line into and out of said pressure motor, pilot valve means for controlling the pressure of the gas in said pressure motor, actuating means for said pilot valve means, means including a control device responsive to a controlling condition for creating a control force having a magnitude bearing a predetermined relation to the value of said condition, means for subjecting said actuating means simultaneously to said control force and to a force indicative of the position of said main valve, and means for causing continuous movement of said main valve during opening movement thereof until said valve has assumed a predetermined minimum open position.

16. In a gas burner control system, a main valve controlling the flow of gas to the burner, a pressure motor for actuating the valve, means for conveying gas from the gas supply line into and out of said pressure motor, pilot valve means for controlling the pressure of the gas in said pressure motor, actuating means for said pilot valve means, means including a control device responsive to a controlling condition for creating a control force having a magnitude bearing a predetermined relation to the value of said condition, means for subjecting said actuating means simultaneously to said control force and to a force indicative of the position of said main valve, and snap action means associated with the actuating means for the pilot valve means for causing continuous movement of said main valve during opening movement thereof until said valve has assumed a predetermined minimum open position.

17. In a gas burner control system, a main valve controlling the flow of gas to the burner, a pressure motor for actuating the valve, means for conveying gas from the gas supply line into and out of said pressure motor, pilot valve means for controlling the pressure of the gas in said pressure motor, actuating means for said pilot valve means, means including a control device responsive to a controlling condition for creating a control force having a magnitude bearing a predetermined relation to the value of said condition, means for subjecting said actuating means simultaneously to said control force and to a force dependent upon the pressure of the fluid fuel on the outlet side of said main valve, and snap action means associated with the actuating means for the pilot valve means for causing continuous movement of said main valve during opening movement thereof until said valve has assumed a predetermined minimum open position.

18. In combination, a valve, a pressure motor for operating the same, a variable source of control pressure, means for subjecting said pressure motor to a pressure differential so related to the control pressure and to the pressure on the outlet side of said valve that a definite relation is maintained between the control pressure and the outlet pressure, an orificed device connected to said valve, and means for compensating for the normal non-linear relation between the flow through said orificed device and the pressure producing such flow so as to maintain relation between the outlet pressure and the flow of fluid through said orificed device.

JOHN L. HARRIS.